Figure 1:
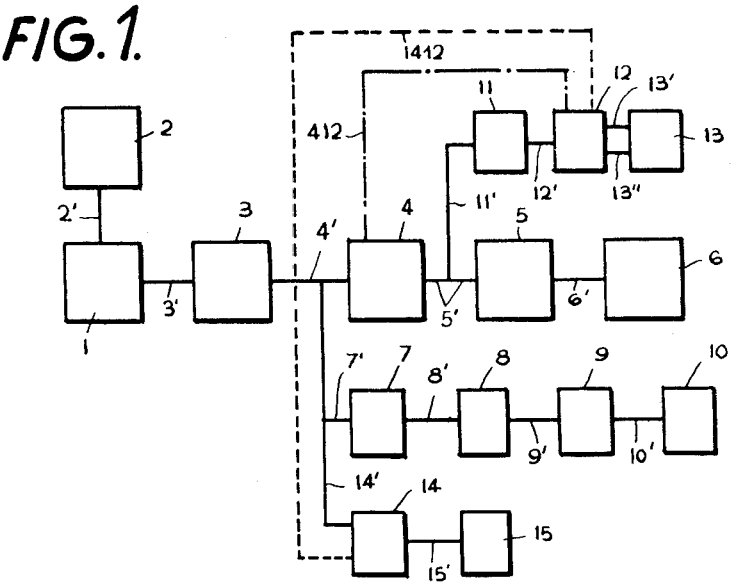

June 26, 1956  R. PERETZ  2,752,467

MEASURING AND/OR CONTROL INSTALLATION FOR ELECTRIC WELDING

Filed Aug. 28, 1953  5 Sheets-Sheet 1

INVENTOR.
Richard Peretz
BY
Wendworth, Lind & Ponack
Attorneys

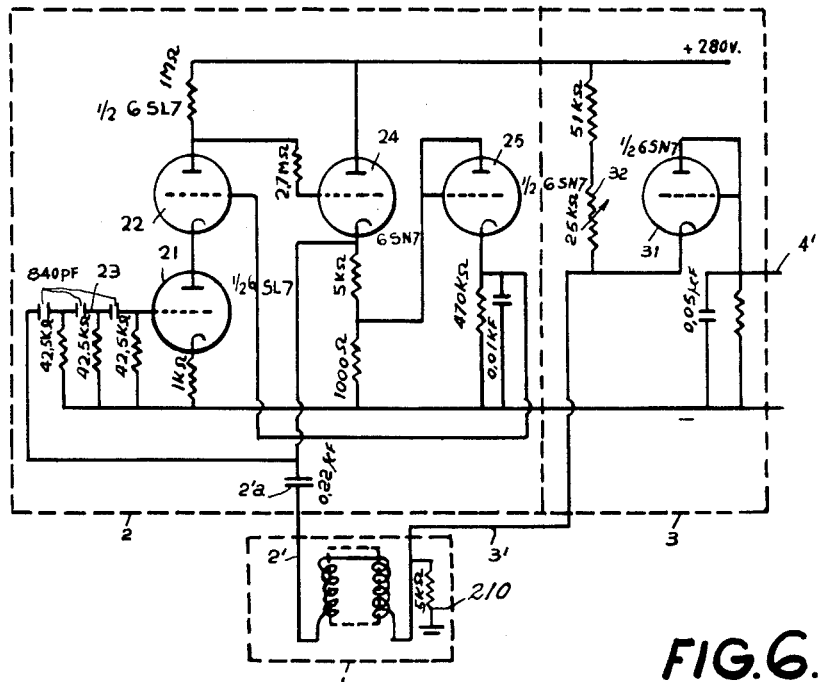
FIG.4.
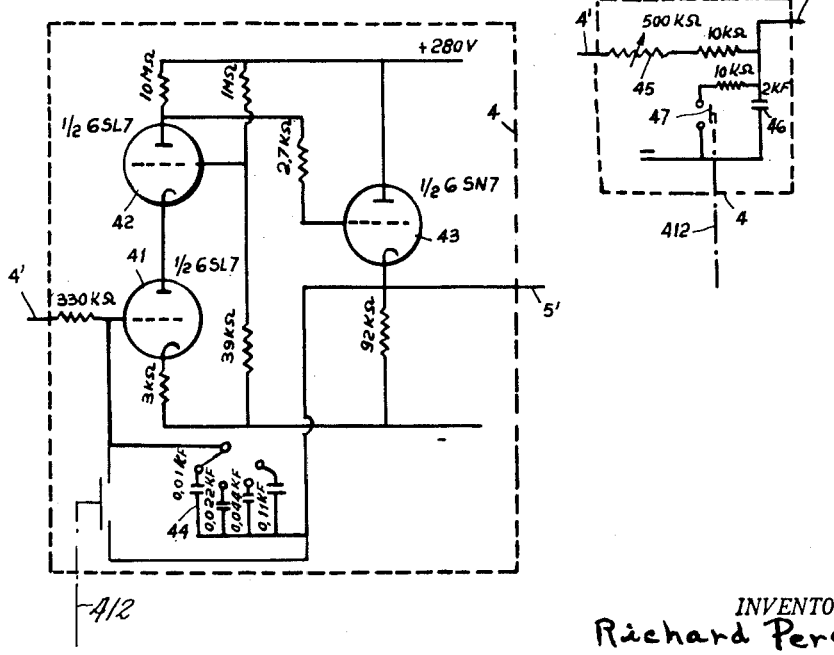
FIG.5.
FIG.6.

INVENTOR.
Richard Peretz
BY
Wenderoth, Lind & Ponack
Attorneys

June 26, 1956 R. PERETZ 2,752,467
MEASURING AND/OR CONTROL INSTALLATION FOR ELECTRIC WELDING
Filed Aug. 28, 1953 5 Sheets-Sheet 4

INVENTOR.
Richard Peretz
BY
Wenderoth, Lind + Ponack
Attorneys

June 26, 1956 R. PERETZ 2,752,467
MEASURING AND/OR CONTROL INSTALLATION FOR ELECTRIC WELDING
Filed Aug. 28, 1953 5 Sheets-Sheet 5

INVENTOR.
R. Peretz
BY
Wenderoth, Lind & Ponack
Attorneys ated June 26, 1956

United States Patent Office 2,752,467
Patented June 26, 1956

2,752,467

MEASURING AND/OR CONTROL INSTALLATION FOR ELECTRIC WELDING

Richard Peretz, Ixelles, Belgium, assignor to Societe Anonyme "Electromecanique," Anderlecht (Brussels), Belgium Application August 28, 1953, Serial No. 377,199
Claims priority, application Belgium September 2, 1952

4 Claims. (Cl. 219—4)

The present invention relates to a measuring and/or control installation for elecrtic welding and concerns more particularly equipments which, when attached to an electric resistance welding machine, permit of measuring the energy supplied to the articles to be welded and of controlling this energy.

It is already known to measure the primary current of the feed circuit of a welding machine and to draw conclusions as to the behaviour of the machine from this measurement. It is assumed that the primary current is proportional to the secondary current or actual welding current. However, this assumption is inaccurate, notably in the case of non-sinusoidal currents. It has therefore been found necessary to measure the welding current itself, and devices have been proposed by means of which it is possible to determine the effective value of this current.

The present invention relates to an installation which, with a simple and robust apparatus of industrial character, permits not only of measuring the effective value of the welding current and the integral of the square of the intensity of this current as a function of time (which constitutes a value very close to the energy transmitted to the articles to be welded), but also, by causing a suitable member to follow the integrating device necessary for the measuring operations, of controlling the feed conditions of the welding machine as a function of values of the aforesaid integral.

According to one feature of the invention, the detection of the welding current is advantageously effected by means of a transducer having an open magnetic energising circuit preferably adjusted to supply directly an indication proportional to the square of the welding current. According to another feature of the invention, there is associated with the device for measuring the integral of the square of the welding current as a function of time a device for measuring the welding time from the detection of this same current.

According to another feature of the invention, the circuit of the integrator comprises adjustable elements permitting of predetermining the quantity of energy transmitted to the articles to be welded for which the control device interrupts the feed current of the machine.

According to another feature of the invention, the control device comprises a device for the control of the effective welding current through an electronic equipment controlling the saturation circuit of a saturable self-inductance controlling the phase shifting of the ignition instant of ignitrons adjusting the utilised fraction of the cycle of the feed current of the welding machine The drawings accompanying the present specification show schematically various arrangements for equipping a welding machine according to the invention as well as a portion of such machine.

Figure 2:
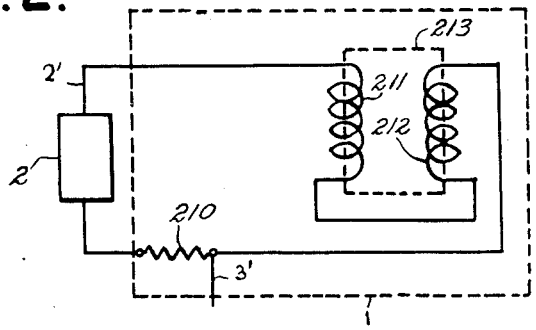
Figure 3:
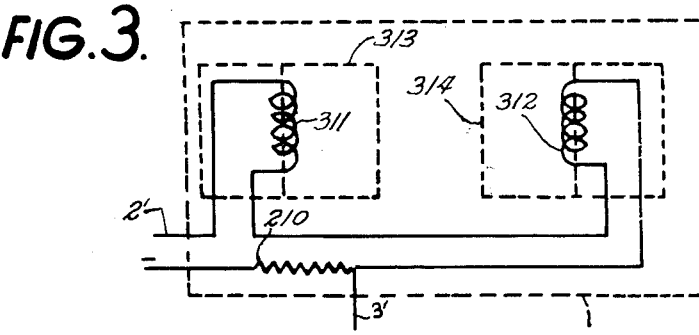
Figure 7:
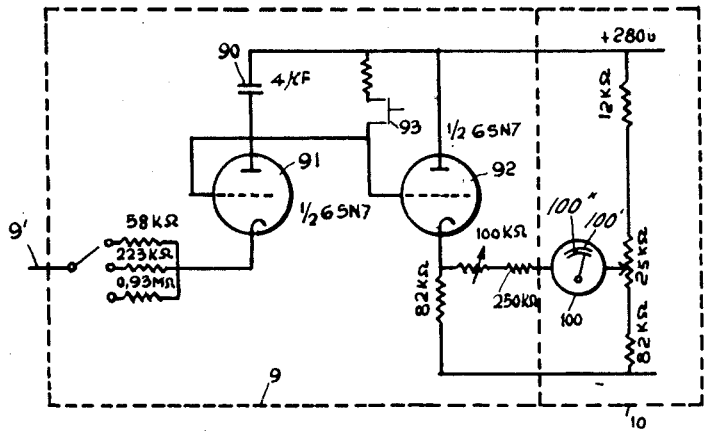
Figure 8:
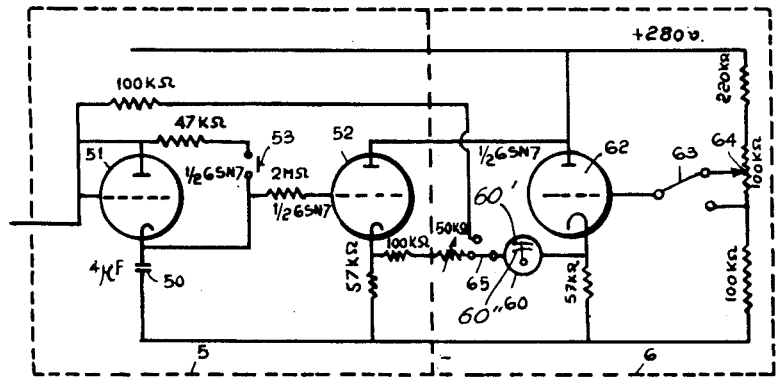
Figure 9:
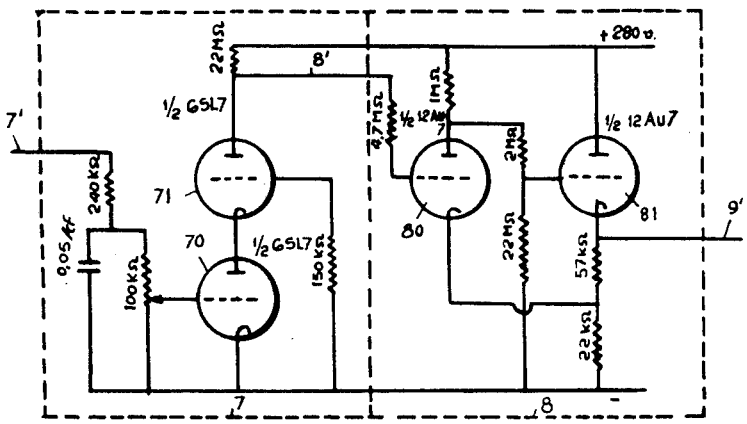
Figure 10:
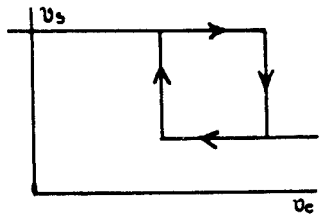
Figure 11:
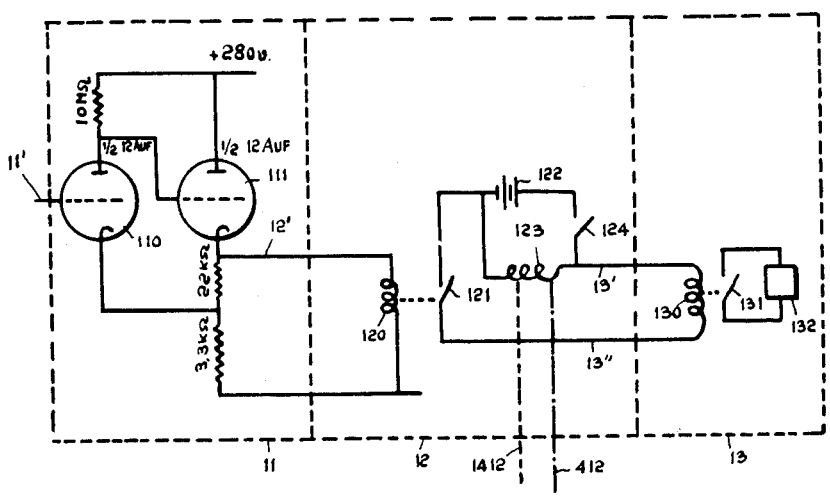
Figure 12:
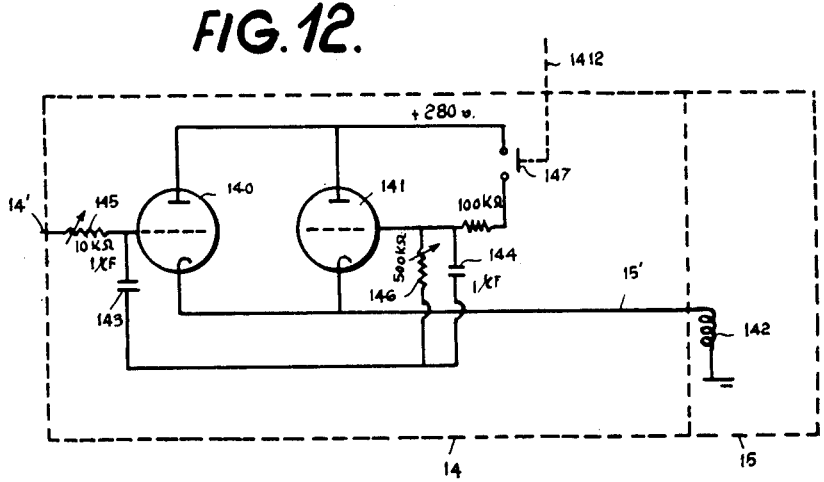

Figure 1 is an overall diagrammatic view of the devices of a measuring and/or control installation according to the invention, Figures 2 and 3 are diagrammatic drawings of two detector devices comprising a transducer, Figure 4 is a diagram of an oscillator feeding the transducer, and of a rectifier applied to its output end, Figures 5 and 6 are diagrams of two constructional forms of an integrator, Figure 7 is a diagram of a memorising device followed by a measuring device, Figure 8 is a diagram of a memorising device and of a differential measuring amplifier device associated therewith, Figure 9 is a diagram of a trigger circuit preceded by an amplifier, Figure 10 is a diagram explaining the operation of the trigger circuit according to Figure 9, Figure 11 is a diagram of an automatic control installation limiting the energy supplied to the articles to be welded, and Figure 12 is a diagram of a device for controlling the effective welding current.

Figure 13:
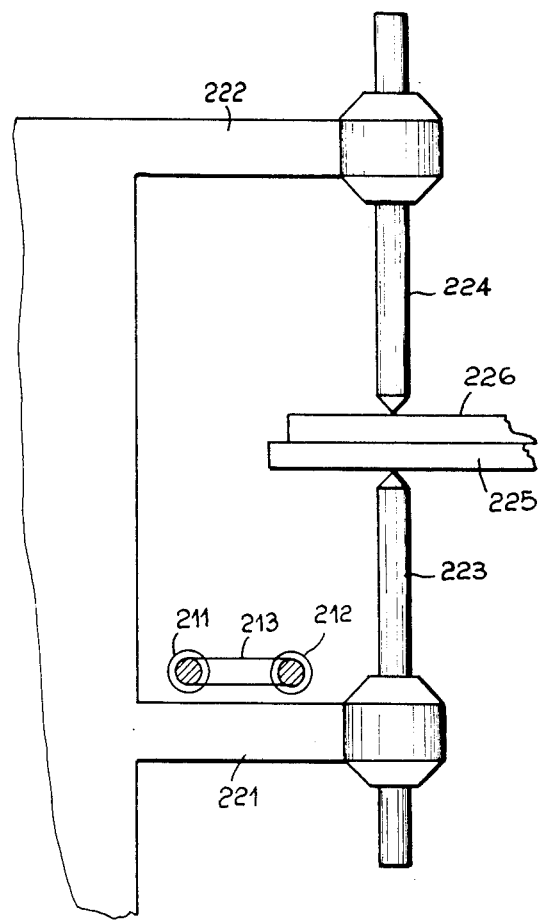

Figure 13 shows schematically a portion of a welding machine according to the invention.

In the various figures in which the same devices are shown, identical references have been employed therefore. The characteristics of the valves, resistances and capacitors are given solely by way of example.

The diagram of Figure 1 represents the whole assembly and the relations between various devices for effecting the measurements and controls according to the invention. Each rectangle designates a particular device. The conductors indicating the connections between these devices have been indicated by the reference numeral designating the device on which they act, followed by a single or double index. Naturally, other connecting conductors are present between these devices and connected to the positive and negative poles of a source of current, the said conductors being designated in the particular figures by "+" and "—" signs. For the sake of clarity, these common conductors have not been shown in Figure 1. In Figure 1, the following devices are shown:

1, transducer
2, feed oscillator of the transducer
3, rectifier
4, integrator
5 and 9, memorising devices
6 and 10, measuring devices
7, amplifier
8 and 11, trigger circuits
12, relay
13, switch for interrupting the feed of the welding machine
14, device for controlling the effective intensity of the welding current
15, device for phase-shifting the instant of the ignition of control ignitrons.

The particular figures showing details of this assembly are surrounded by chain-lined rectangles which correspond to the aforesaid rectangles 1 to 15.

Upon Figure 13 there has been shown a portion of a welding machine by the resistance comprising two arms 221 and 222 carrying the electrodes 223 and 224 respectively. The elements to be soldered are indicated at 225 and 226. Adjacent arm 221 there is located a transducer which has been schematically shown with a saturable closed magnetic core 213 carrying two windings 211 and 212. The core is of sheet metal and the windings are wound in opposite directions so as not to produce any exterior electromotive force. This connection of the windings is shown upon Figure 2. The two branches of the magnetic core 213 upon which the windings 211 and 212 are wound have their axes perpendicular to the plane of the paper in Figure 13.

Because of the fact that the core 213 and the windings 211 and 212 are located in this way in the exterior field created about the arm 221 by the passage of the welding current in such arm, the exterior field defines for each winding an open magnetic circuit which is superposed upon the closed circuit formed by the core 213. The exterior field created by the passage of the welding current produces a saturation of the magnetic core and consequently diminishes the impedance of the electric circuit of which the windings 211 and 212 are a portion. These windings are connected in series with a load resistance (Figure 2) and the generator of the electrical oscillations 2. The frequency of the latter is higher than that of the welding current. The potential difference between the terminals of the load resistance 210 is a function of the intensity of the exterior field, that is of the welding current which produced it. This depends also upon the position of the core around the arm at the side of which it is placed. It will be understood that on the contrary no matter in which one of these positions that it can occupy around such arm, the core can only influence very slightly the welding current. The fall of potential in the load resistance 210 is rectified by the rectifier 3 (Figures 1 and 4) connected as a shunt thereon. If the point of operation of the transducer is so chosen as to lie in the saturation zone, and if the load resistance is suitably adjusted, a quadratic response can be obtained from the apparatus, that is to say, the mean rectified value of the voltage obtained across the terminals of the series resistance 10 will be proportional to the square of the current setting up the energising field.

Upon Figure 3 there has been shown another form for constructing the transducer in which the two windings in series with the oscillator 2 and the load resistance 210 are wound upon two separate cores 313 and 314. Their two windings are designated by 311 and 312. The two cores 313 and 314 define closed magnetic circuits. They are placed adjacent one of the arms 221 and 222 of Figure 13 in the field created by the passages of the winding current.

The source of alternating current 2 advantageously consists of an oscillator comprising electronic valves, the diagram of which is shown in Figure 4. In this figure, in which the transducer can be seen in the rectangle 1, there are seen at 21 and 22 two valves in superposed arrangement (the anode of the valve 21 being connected to the cathode of the tube 22). The grid of the first valve is connected, by means of a resistance-capacitance phase-shifting line 23 connected to the cathode of an output valve 24 connected as a cathodyne. The grid of the second valve is subjected to a direct potential taken, for example, from the cathode of a rectifier valve 25 following the oscillator assembly. This results in a stabilising effect, since any increase in the amplitude of the voltage generated by the oscillator brings about an increase in the grid potential and consequently a decrease in the plate voltage. The alternating voltage obtained from the capacitance 2'a is applied to the transducer. The voltage across the terminals of the resistance 10 is detected by the triode 31 operating as a diode on account of the connection of its grid to its anode. The output voltage is obtained between the wires 3' and —. The resistance 32 permits of adjusting the threshold of detection of the alternating voltage obtained across the terminals of the resistance 10. Since the measuring installation according to the invention necessitates the production of a voltage proportional to the integral of $i^2 dt$ defined for a period $t$, namely $\int_0^t i^2 dt$, it is necessary to provide an integrator. There is shown in Figure 5 a diagram of such an arrangement, in which use is made of a double-triode amplifier 41, 42, in superposed arrangement, comprising an output cathode follower 43, the feedback line comprising a capacitance 44 (adjustable). Figure 6 shows another integrator comprising a capacitance 46 and a resistance (variable) 45. The capacitance 46 (Figure 6) may be shortcircuited with a discharge resistance by means of a switch, such as the switch 47. Upon Figure 5 it does not make any difference which of the different capacities 44 are placed in shortcircuit through an interrupter similar to the interrupter 47 of Figure 6 mounted as a shunt upon the circuit comprising the assembly of these capacities and the commutator permitting placing one or the other of the latter in service. In these integrator arrangements, it may be assumed that under the conditions of use the output voltage obtained across the terminals (5′, —) is proportional to the integral, defined for a given period, of the input voltage (4′, —).

Figures 7 and 8 show memorising devices operating in the same manner and differing only in details of their circuit arrangement. The essential member thereof is a capacitance 90 (and 50 respectively) which is charged by a triode 91 functioning as a diode (and 51 respectively), the signal arriving at the cathode through 9′ (and 5′ respectively). The capacitance cannot normally be discharged alone because its circuit is closed through an output cathode follower 92 (and 52 respectively). When it is desired to discharge the capacitance, a discharge circuit is closed by means of the switch 93 in the case of Figure 7 and 53 in the case of Figure 8.

Figures 7 and 8 also show devices for measuring the voltages obtained across the terminals of the capacitances (90 and 50 respectively). In the case of Figure 7, this measurement is effected by a milliammeter 100 connected to the output end of the cathode follower 92. In Figure 8, the measurement is effected by a milliammeter 60 connected between the cathodes of the two associated cathode followers 52 and 62. It will be seen that the grid of the valve 62 is connected to a potentiometer 64 which permits of stabilising the arrangement. On the other hand, in order that the initial operating conditions of the integrator may be determined by adjusting the resistance 32 (Figure 4), a changeover switch 63 is provided. This changeover switch must apply to the grid of the valve 62 a known voltage for the adjusting operation, which is performed by placing this changeover switch in its lower position. In order to effect this adjustment, a changeover switch 65 is placed in its upper position.

It will be seen that the association of the devices shown in the rectangles 1, 2, 3, 4, 5 and 6 of Figure 1 permits of measuring the integral $\int_0^t i^2 dt$, that is to say, the integral of the square of the intensity of the welding current as a function of time, the memorising device being necessary to enable an indication corresponding to a very brief phenomenon to be read during a predetermined time. It will be noted that the integral $\int_0^t i^2 dt$ represents only a value approximating to the energy supplied to the articles to be welded, the exact expression of which energy would be $\int_0^t R i^2 dt$, R being the resistance, which is very variable, of the articles to be welded. However, since the arrangement is intended for comparative measurements and must permit the repetition of cycles which are desired to be identical, the indicative value of the integral measured is quite sufficient.

The invention also concerns means for measuring the welding time from the detection of the welding current itself. For this purpose, there is employed in association with the devices 1, 2 and 3 already described a circuit comprising the devices 7, 8, 9 and 10, the operation of which will readily be understood by combining Figures 9 and 7 in accordance with the indications of Figure 1. The signal (voltage wave as a function of the welding current) arriving from the rectifier 3 through the conductors 4′ and 7′ acts on the grid of a triode 70 (Figure 9) associated with another triode shown above the first one. These two valves constitute an amplifier. The amplified signal passes through conductor 8′ to a trigger circuit 8 which comprises the valves 80 and 81, the assembly of which constitutes a positive feed-back amplifier. The valve 81 is a cathode follower. The positive feed-back is transmitted to the cathode of the valve 80 through the output cathode follower 81. The output signal is transmitted through conductor 9' to the memory 9. This positive feed-back amplifier has two states of equilibrium, which are represented by the diagram of Figure 10, in which the variations of the output voltage ($v_s$) obtained across the terminals (9', —) as a function of the input voltage ($v_e$) obtained across the terminals (8', —) are shown. It will be seen that a voltage of constant value (rectangular wave) is obtained throughout the duration of the passage of the welding current, the passage from the upper threshold to the lower threshold and vice versa taking place for small variations of the input voltage in both directions. The rectangular wave obtained charges a capacitance 90 (Fig. 7) forming part of the memory 9, and a measuring device 100 forming part of the measuring arrangement 10 gives an indication proportional to the charging voltage of the said capacitance, which is a function of the duration of the welding phenomenon.

The association of the devices 1, 2 and 3 completed by the devices 4, 5 and 6 giving the value of $\int_0^t i^2 dt$, and of the devices 7, 8, 9 and 10 which measure $t$ permits of determining the effective welding current by a simple division of the measurement results. In order to avoid the extraction of a square root, the dial of the instrument 60 in Figure 8 is graduated into (amperes)$^2$×seconds and into amperes×(seconds)$^{1/2}$. The references of the two scales are respectively 60' and 60". The dial of the instrument 100 (Figure 7) is graduated into seconds and (seconds)$^{1/2}$. The references of the two last scales are respectively 100' and 100".

The installation according to the invention permits of effecting an automatic limitative control of the energy transmitted to the article to be welded. This purpose is achieved by the association of the devices 1, 2, 3, 4 and 11, 12, 13. Figure 11 shows the details of the latter three devices. The trigger circuit 11 comprises two valves 110 and 111 which operate in the same manner as respectively the valves 80 and 81 of the trigger 8. Their output circuit comprises the winding of a relay 120, the said winding being connected between the conductors 12' and —. The contact 121 of this relay is maintained in the closed position when the output voltage of the trigger circuit is at its upper equilibrium value. It is opened when current flows into the winding 120. A source of energy 122 feeds a first circuit comprising the winding 123 of a relay which, when voltage is applied thereto, opens the switch shunting the capacitance of the integrator (for example the switch 47 if the integrator is of the type described with reference to Figure 6; this effect is symbolised by the link 412 of Figures 1 and 6), and the switch 124 which closes when the electrodes press the article to be welded. Connected in shunt to the winding 123 is the circuit containing the switch 121 and the winding 130 of a relay which trips a feed interrupting switch 131 forming part of the welding machine, the feed part of which is diagrammatically represented by the rectangle 132.

The operation of this arrangement is as follows: Initially, the capacitor of the integrator (for example the capacitor 46 if the integrator of Figure 6 is employed, is short-circuited. The trigger circuit 11 is in its upper state of equilibrium, and the switch 121 is closed. When the pressure of the electrodes is exerted, the switch 124 closes, the circuit-breaker (130, 131) is tripped and the welding commences. At the same time, the winding 123 determines the opening of the circuit which short-circuits the capacitance 46 (or 44 if an integrator such as that shown in Figure 5 is employed). This capacitance commences to be charged with a voltage proportional to the energy supplied. At the end of a time determined by the value (variable) of the resistance 45 (and of the capacitance 44 respectively), the trigger circuit changes its state of equilibrium and the relay 120 opens the contact 121, whereby the circuit-breaker 131 is released. The welding is finished, with consumption of the energy which the machine has been permitted to supply. When the electrodes are withdrawn, the switch 124 opens, the relay 123 is no more fed with current and the switch in parallel with the capacitance of the integrator is closed, whereby this capacitance is short-circuited until the beginning of subsequent welding operation.

The use of the devices 14 and 15 (Figure 12) in association with the devices 1, 2 and 3 permits of completing the control of the feed conditions of the welding machine by controlling the effective welding current. A voltage tapping 14' connected at a point following the rectifier 3 leads to the grid of a valve 140 connected in parallel (with regard to the cathodes and the plates) with a valve 141, the two valves being connected as cathode-followers. The circuit of the cathodes comprises a self-inductance 142 constituting the saturation circuit of a saturable self-inductance, which is not shown, but which forms part of the phase-shifting arrangement represented by the rectangle 15. The said saturable self-inductance controls in accordance with a known system the phase-shifting of the instant of ignition of ignitrons regulating the fraction utilised of the period of the feed current of the machine, this control taking place in such direction that the duration of the passage of the welding current decreases when the saturation current produced by the parallel connected cathode followers valves increases. The grid circuits of the valves 140 and 141 comprise in shunt the capacitances 143 and 144 and, in addition, resistances (variable) 145 and 146. The switch 147 is controlled by the winding 123 of the relay of the assembly 12 (symbolic link 1412) in such direction that this switch is opened when the winding 123 receives voltage. The assembly thus described operates as follows: As soon as the pressure of the electrodes is exerted on the articles to be welded, the contact 147 opens and the capacitance 144 is discharged into the resistance 146. The grid potential of the valve 141 decreases and the current of the saturation circuit 142 decreases, whereby the welding current is allowed to pass for a greater duration. The effective mean value of the intensity of this current increases until the instant when the voltage across the terminals of the capacitance 143 reaches the value of the voltage across the terminals of the capacitance 144. At this instant, the preheating period for the articles to be welded is finished and the current in the saturation circuit 142 maintains the effective value of the welding current at a constant level.

In the case of welding by means of a roller controlled by ignitrons, the invention permits of controlling the energy supplied to the article to be welded by making the phase-shifting of the ignition instant of the latter dependent upon the mean value of the voltage proportional to the energy supplied to the articles to be welded.

It is obvious that all the devices hereinbefore described may operate simultaneously, or any single measuring or controlling device may be employed alone by means of appropriate cut-outs.

The invention is not limited to the arrangements described, but it is obvious that they may be modified in ways apparent to persons skilled in the art without departing from the scope of the invention. The values of the resistances and other elements of the circuits are not critical and have therefore not been limited in the present description, in which only the elements essential to the understanding of the invention have been described, the others not departing from the present state of the art in the field of electronic equipment.

What I claim is:

1. Electric resistance welding machines comprising two arms for bearing the welding electrodes, a saturable closed magnetic core situated in the magnetic field generated by the flow of the welding current, disposed on one side of one of said arms, at least two windings wound on said core in such a manner as not to induce an electromotive force at the exterior of the whole formed by the core and the windings on it, said core and windings being positioned in such a manner that the magnetic circuit presented to the induction flux generated by the welding current is formed substantially by air, an oscillator generating electric oscillations of a frequency higher than that of the welding current, said generator feeding said windings, a resistance connected in series with said oscillator and windings, and a rectifier in shunt on the terminals of said resistance for giving the mean value of the rectified tension generated between the terminals of the resistance, the value of the latter and that of the tension produced by the oscillator as well as the characteristics of the magnetic material constituting said core being so chosen that the rectified value of the alternating current which flows through said windings is a quadratic response to the welding current.

2. Electric resistance welding machine comprising two arms for bearing the welding electrodes, a saturable closed magnetic core situated in the magnetic field generated by the flow of the welding current, disposed on one side of one of said arms, at least two windings wound on said core in such a manner as not to induce an electromotive force at the exterior of the whole formed by the core and the windings on it, said core and windings being positioned in such a manner that the magnetic circuit presented to the induction flux generated by the welding current is formed substantially by air, an oscillator generating electric oscillations of a frequency higher than that of the welding current, said generator feeding said windings, a resistance connected in series with said oscillator and windings, a rectifier in shunt on the terminals of said resistance for giving the mean value of the rectified tension generated between the terminals of this resistance, the value of the latter and that of the tension produced by the oscillator as well as the characteristics of the magnetic material constituting said core being so chosen that the rectified value of the alternating current which flows through said windings is a quadratic response to the welding current, an integrator connected to the output of said rectifier, a memorising device connected to the output of said integrator, a measuring device connected to the output of said memorising device, the dial of this measuring device being graduated into (amperes)$^2$ × seconds and into amperes × seconds $^{1/2}$, an amplifier connected to the output of said rectifier, a trigger connected to the output of said amplifier, a memorising device connected to the output of said trigger, and a measuring device connected to the output of this last memorising device, the dial of the latter being graduated into seconds and into (seconds) $^{1/2}$.

3. Electric resistance welding machine comprising two arms for bearing the welding electrodes, a saturable closed magnetic core situated in the magnetic field generated by the flow of the welding current, disposed on one side of one of said arms, at least two windings wound on said core in such a manner as not to induce an electromotive force at the exterior of the whole formed by the core and the windings on it, said core and windings being positioned in such a manner that the magnetic circuit presented to the induction flux generated by the welding current is formed substantially by air, an oscillator generating electric oscillations of a frequency higher than of the welding current, said generator feeding said windings, a resistance connected in series with said oscillator and windings, a rectifier in shunt on the terminals of said resistance for giving the mean value of the rectified tension generated between the terminals of the resistance, the value of the latter and that of the tension produced by the oscillator as well as the characteristics of the magnetic material constituting said core being so chosen that the rectified value of the alternating current which flows through said windings is a quatratic response to the welding current, an adjustable integrator connected to the output of said rectifier, a capacitance forming a part of this integrator, a switch in parallel on this capacitance, said switch being normally closed, a trigger connected to the output of said integrator, a relay in the output circuit of this trigger, a feed interrupting switch of the welding machine which is normally opened, a source of energy, a circuit in parallel on this source of energy comprising a switch normally opened but which is closed by the pressure of the electrodes and the winding of a second relay, which, when put under tension, opens the switch in parallel on the capacitance of the integrator, and a circuit in parallel on the winding of said second relay, said circuit comprising, on the one hand, a normally closed switch which is opened by the relay in the output of said trigger when current flows into the winding of this relay and, on the other hand, the winding of a relay which, when a current flows into it, closes said feed interrupting switch of the welding machine.

4. Electric resistance welding machine comprising two arms for bearing the welding electrodes, a saturable closed magnetic core situated in the magnetic field generated by the flow of the welding current, disposed on one side of one of said arms, at least two windings wound on said core in such a manner as not to induce an electromotive force at the exterior of the whole formed by the core and the windings on it, said core and windings being positioned in such a manner that the magnetic circuit presented to the induction flux generated by the welding current is formed substantially by air, an oscillator generating electric oscillations of a frequency higher than that of the welding current, said generator feeding said windings, a resistance connected in series with said oscillator and windings, a rectifier in shunt on the terminals of said resistance for giving the mean value of the rectified tension generated between the terminals of the resistance, the value of the latter and that of the tension produced by the oscillator as well as the characteristics of the magnetic material constituting said core being so chosen that the rectified value of the alternating current which flows through said windings is a quatratic response to the welding current, a resistance connected to the output circuit of said rectifier, a first cathode follower the grid of which is connected to the terminal of said resistance which is opposite to that directly connected to the output circuit of the rectifier, a second cathode follower whose cathode and anode are directly connected respectively to the cathode and to the anode of the first one, a capacitance disposed between the grid of the first cathode follower and the negative pole, another capacitance disposed between the grid of the second cathode follower and the negative pole, a resistance in shunt with this last capacitance, a switch between the grid of the second cathode follower and the anode of the latter, an auxiliary source of energy, a circuit in parallel with this source of energy comprising a switch normally opened but which is closed by the pressure of the electrodes and the winding of a relay which, when put under tension, opens the switch between the grid and the anode of the second cathode follower, a saturation winding between the cathodes of the two cathode followers and the negative pole, and a saturable self-inductance forming part of the phase shifting arrangement of the instant of ignition of ignitrons of the feed circuit of the welding machine, said saturable self-inductance being saturated by the current flowing into said saturation winding and controlling the phase shifting arrangement in such a manner that the duration of flowing of the welding current decreases when the current in the cathodic circuit of the two cathode followers increases.

References Cited in the file of this patent

UNITED STATES PATENTS

| | | |
|---|---|---|
| 2,295,293 | Rogers | Sept. 8, 1942 |
| 2,310,112 | Palmer et al. | Feb. 2, 1943 |
| 2,348,553 | Livingston | May 9, 1944 |